United States Patent
Zurek et al.

[11] Patent Number: 6,064,894
[45] Date of Patent: May 16, 2000

[54] PORTABLE RADIO TELEPHONE HAVING IMPROVED SPEAKER AND HOUSING ASSEMBLY FOR HANDSFREE AND PRIVATE OPERATION

[75] Inventors: Robert A. Zurek, Antioch; Michael L. Charlier, Palatine; Thomas Gitzinger, Woodstock, all of Ill.

[73] Assignee: Motorola, Inc., Schaumburg, Ill.

[21] Appl. No.: 09/079,098

[22] Filed: May 14, 1998

[51] Int. Cl.⁷ .................................................. H04Q 7/20
[52] U.S. Cl. .................... 455/569; 455/570; 455/575; 455/347; 455/350
[58] Field of Search .................... 455/569, 570, 455/575, 90, 350, 351, 347, 386; 379/420, 433, 428

[56] References Cited

U.S. PATENT DOCUMENTS

| | | | |
|---|---|---|---|
| 4,727,583 | 2/1988 | Weber | 381/332 |
| 5,170,436 | 12/1992 | Powell | 381/338 |
| 5,450,495 | 9/1995 | Goldfarb | 381/89 |
| 5,588,041 | 12/1996 | Meyer, Jr. et al. | 379/59 |
| 5,655,017 | 8/1997 | Fishman | 379/420 |
| 5,721,787 | 2/1998 | Neibaur et al. | 381/205 |
| 5,883,966 | 3/1999 | Kubo | 381/386 |

FOREIGN PATENT DOCUMENTS

| | | |
|---|---|---|
| 2 311 187 | 9/1997 | United Kingdom . |
| 2311187 | 9/1997 | United Kingdom . |
| WO 97/47117 | 12/1997 | WIPO . |

*Primary Examiner*—Thanh Cong Le
*Assistant Examiner*—Yemane Woldetatios
*Attorney, Agent, or Firm*—Rolland R. Hackbart

[57] ABSTRACT

A portable radio telephone is adapted to provide handsfree operation and adapted to be held against a user's ear to provide private operation. A housing of the portable radio telephone has an ear placement region on a front surface thereof. A speaker is disposed in the housing behind the ear placement region. The ear placement region is adapted to be held against a user's ear to provide private operation creating a first air volume between the user's ear and the ear placement region. In a preferred embodiment, an air path between the first air volume to a second air volume at the back surface of the housing includes at least a first port positioned within the ear placement region, an air cavity within the housing, and at least a second port positioned at a back surface of the housing.

20 Claims, 5 Drawing Sheets

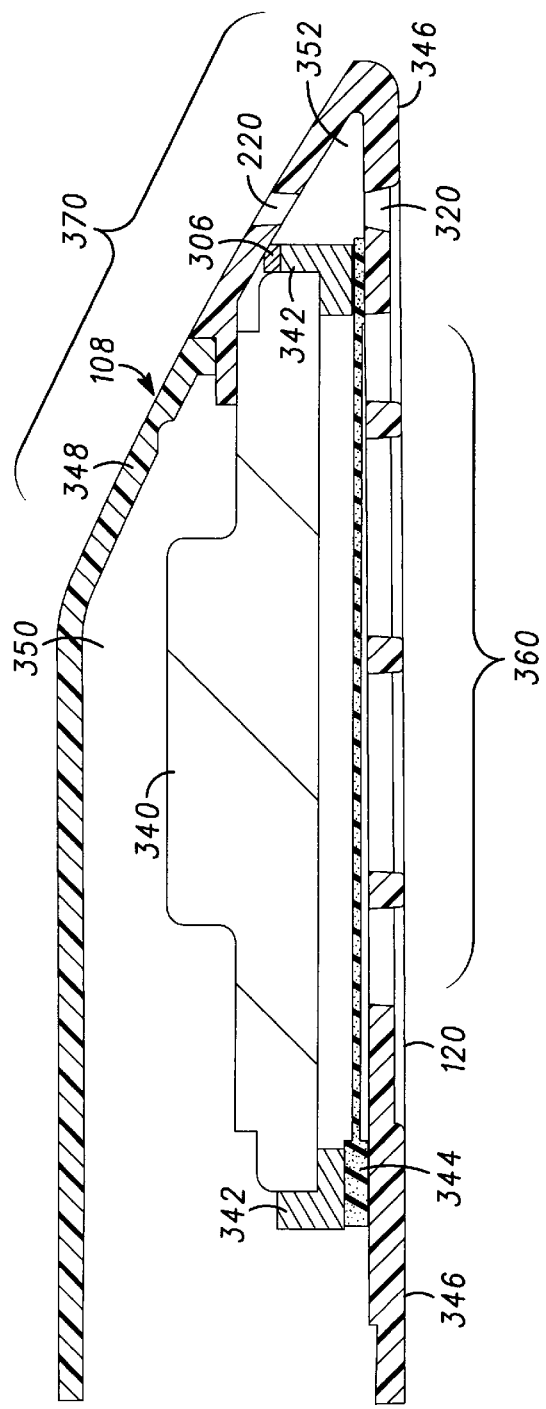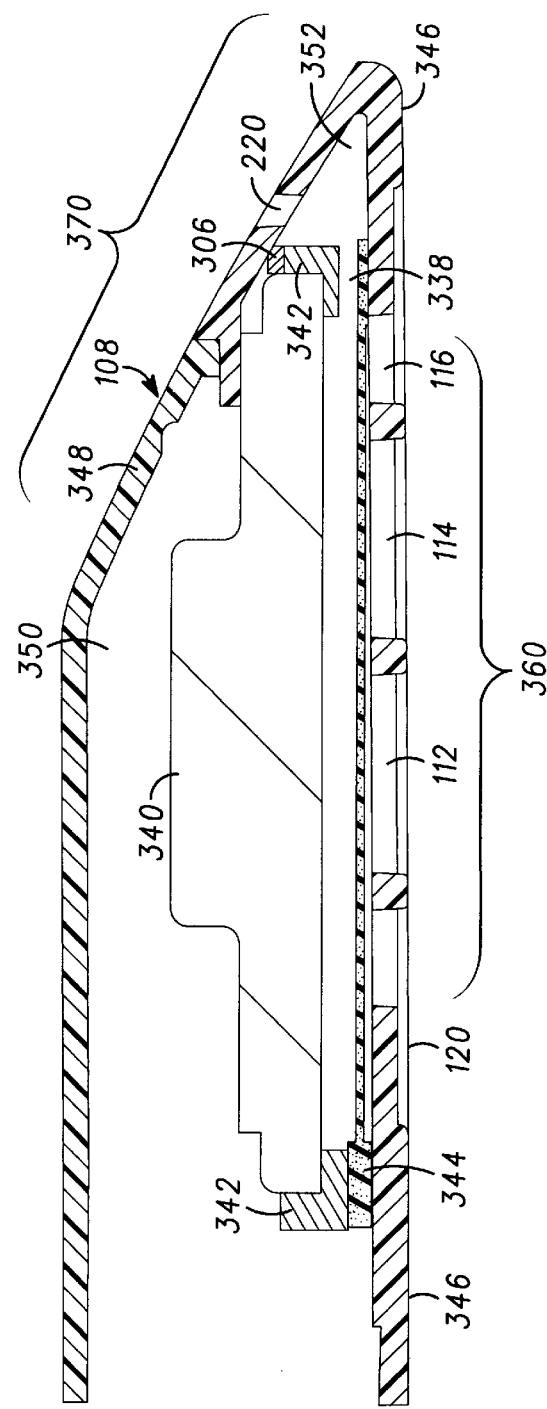

PORTABLE RADIO TELEPHONE HAVING IMPROVED SPEAKER AND HOUSING ASSEMBLY FOR HANDSFREE AND PRIVATE OPERATION

FIELD OF THE INVENTION

The present invention relates generally to the field of portable electronic devices, and more particularly to a portable radio telephone having an improved speaker and housing assembly for handsfree and private operation.

BACKGROUND OF THE INVENTION

A portable electronic device, such as a portable radiotelephone, employs a speaker to convert electrical signals into sound waves in the human-audible frequency range of 20 Hertz (Hz) to 20,000 kilo-Hertz (kHz). When positioned against the user's ear during private operation, the speaker enables a user of the radiotelephone to hear a representation of a caller's voice, as well as other sounds such as dial tones. It is desirable to use the same speaker for handsfree operation in order to minimize cost and size of the portable electronic device. In order for the speaker to produce an acceptable sound pressure level in the human-audible frequency range during handsfree operation, the speaker needs to have a relatively high compliance. A high compliance speaker can be characterized as having a relatively large effective air volume. If the effective air volume of such a high compliance speaker is large with respect to the air volume that the speaker is radiating into, and also large with respect to the air cavity that the speaker is mounted in, then the low frequency response of the speaker is significantly reduced. This degradation in the low frequency response occurs when a high compliance speaker is held up to the user's ear during private operation of the portable electronic device.

Accordingly, a need therefore exists for a speaker and housing assembly for small portable radio telephones, which is tuned to provide acceptable audio quality in both handsfree and private operation.

BRIEF DESCRIPTION OF THE DRAWINGS

FIG. 5 is a cross sectional view of the upper housing taken along a line 5–5' of FIG. 3.

FIG. 6 is a cross sectional view of an alternate embodiment of the upper housing taken along a line 6–6' of FIG. 4.

DETAILED DESCRIPTION OF THE PREFERRED EMBODIMENTS

A portable electronic device such as a portable radio telephone has a speaker with a relatively high compliance that is used for both private operation and for handsfree operation. A housing has an ear placement region on an outside surface and is configured to carry at least one of a receiver and a transmitter.

Figures 1, 2:
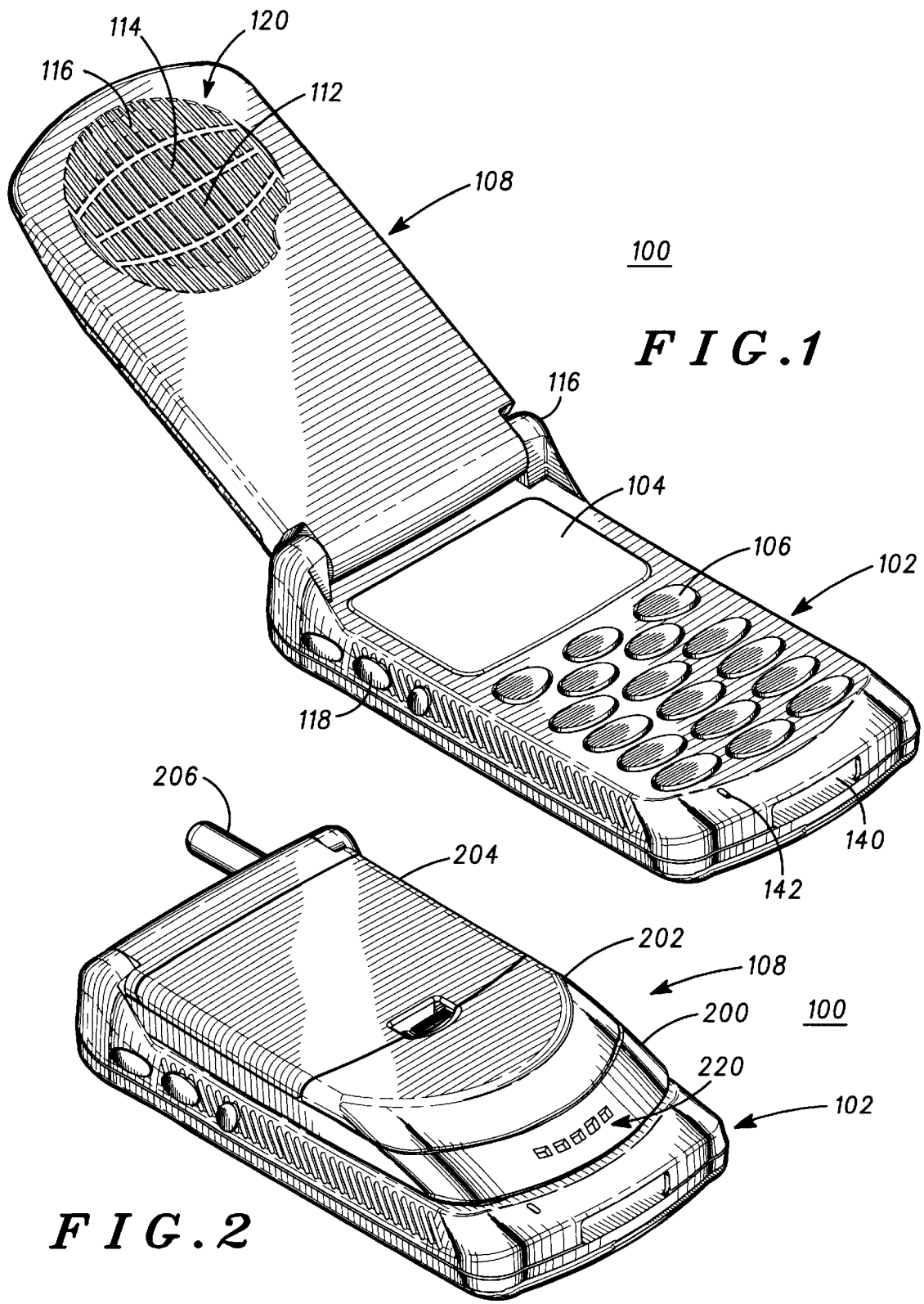
FIG. 1 is a perspective view of a portable radio telephone in an open position.
FIG. 2 is a perspective view of the portable radio telephone in a closed position.

FIGS. 1 and 2 show a perspective views of portable radiotelephone 100 that provides for wireless communication via radio frequency (RF) signals. Portable radiotelephone 100 is a preferred embodiment of a portable electronic device embodying the present invention. Portable radio telephone 100 may be operable in a variety of cellular telephone systems and is commonly referred to as a portable cellular telephone.

Portable radiotelephone 100 has an upper housing 108 and a lower housing 102 rotatably connected via a hinge 116. Portable radiotelephone 100 has a open position, as shown in FIG. 1, and a closed position, as shown in FIG. 2. With such a configuration, portable radio telephone 100 is commonly referred to as a foldable or clamshell style telephone. Upper and lower housings 108 and 102 form a housing of portable radio telephone 100. The housing has a receiver and a transmitter (not shown) disposed therein (here, in lower housing 102) for providing RF communication.

Upper housing 108 in FIG. 2 is formed by a front housing portion 200 and a rear housing portion 202 having a cavity into which battery pack 204 is inserted for powering the portable radio telephone 100. Upper housing 108 also has an ear placement region 120 (see FIG. 1) on the front surface thereof, where an ear of a user is positioned for listening to voice signals from a speaker (not visible in FIGS. 1 and 2). An opening 112 and a plurality of additional openings 114 and 116 are formed on the front surface within ear placement region 120 for emitting sound from speaker 340 (see FIG. 3). Also, five additional ports 220 (see FIG. 2) are formed on the back surface of the upper housing 108.

Lower housing 102 includes a rear housing portion carrying a display lens 104 that is substantially flush with a front surface thereof. Lower housing 102 includes a front housing portion carrying a plurality of input keys 106, including conventional telephone keys (0–9, *, and #) and function keys, on a front surface thereof. In addition, three input keys 118 are exposed on a left side surface of lower housing 102. A user of portable radio telephone 100 may select between handsfree operation and private operation by entering predetermined key sequences, by entering a menu to select between them, or by any other suitable means. A message such as "handsfree" or "private" may be entered in display 104, or aural and/or visual indicators may inform the user whether handsfree operation or private operation has been selected.

An retractable or fixed antenna 206 (see FIG. 2) is positioned at a top surface of lower housing 102. An opening 140 is formed on a bottom surface of lower housing 102 and exposes an electrical connector (not shown) provided for communication of input/output data or receiving electrical energy through a cigarette lighter adapter (not shown). An opening 142 is formed on the front surface, where a mouth of a user is positioned for talking into a microphone (not visible in FIGS. 1 and 2).

Figure 3:
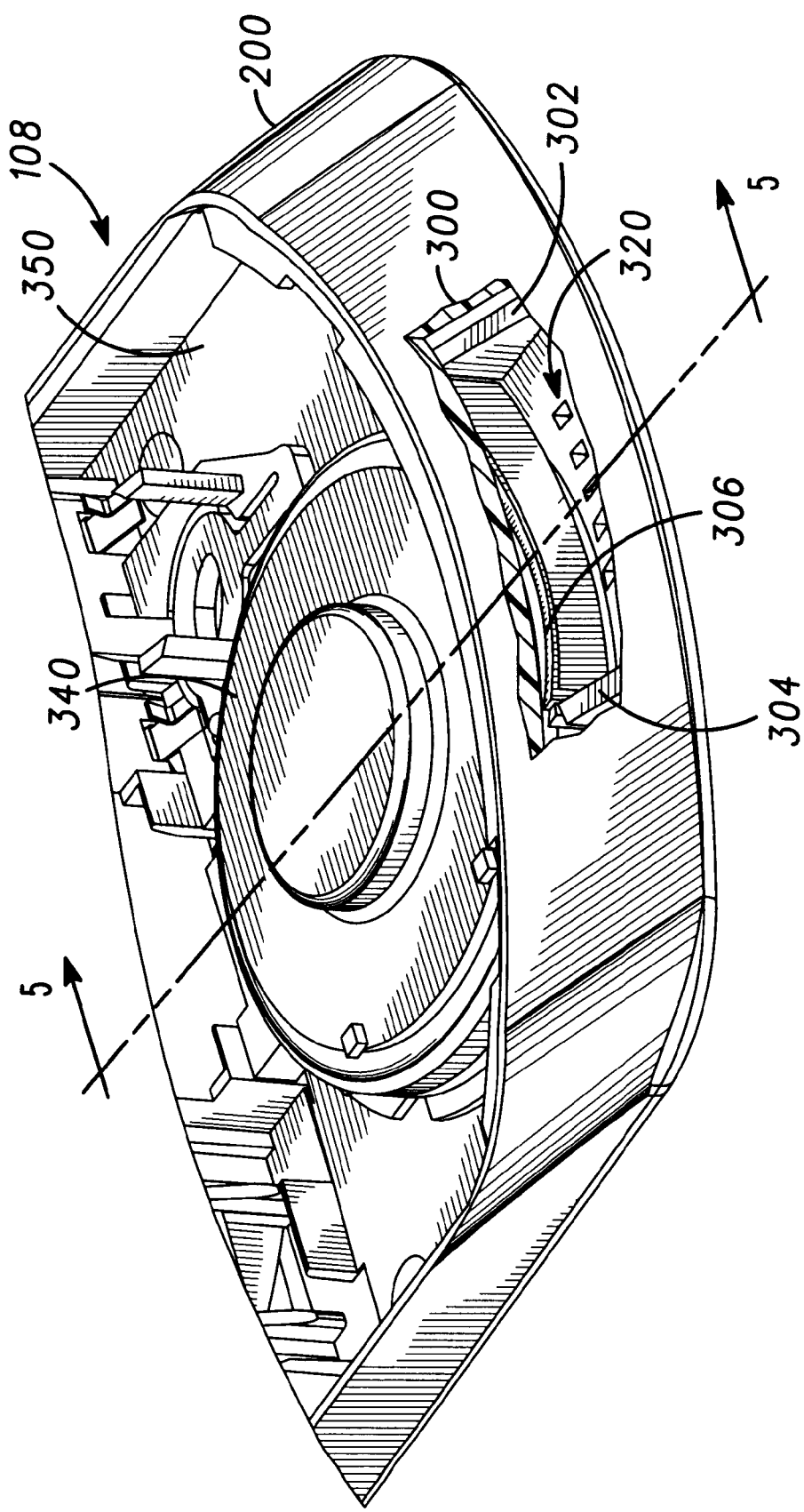
FIG. 3 is a perspective view of a partial assembly of the upper housing with a cutaway.

FIG. 3 is a partial perspective view of a preferred embodiment of the upper housing 108 with a cutaway 300 exposing five ports 320 formed in the ear placement region 120 of upper housing 108. The five ports 320 are opposite the five ports 220 in the front portion of the upper housing 108 as illustrated in FIG. 5. Internal air cavity 350 behind speaker 340 in FIG. 3 is acoustically sealed from the front of speaker 340 by the spacer 342 and the felt member 344, and from air cavity 352 by the spacer 342 and the gasket 306 as illustrated in FIG. 5. Thus, this port and cavity system in FIG. 3 is enclosed and sealed off from the internal cavity 350 by way of the spacer 342, the felt member 344 and the gasket 306. Air cavity 352 in FIG. 3 is formed by walls 302 and 304, the adjacent wall of the spacer 342 and the adjacent walls of upper housing 108. The gasket 306 in FIG. 3 provides a seal between the spacer 342 and wall 302, wall 304 and adjacent walls of the upper housing 108.

Figure 4:
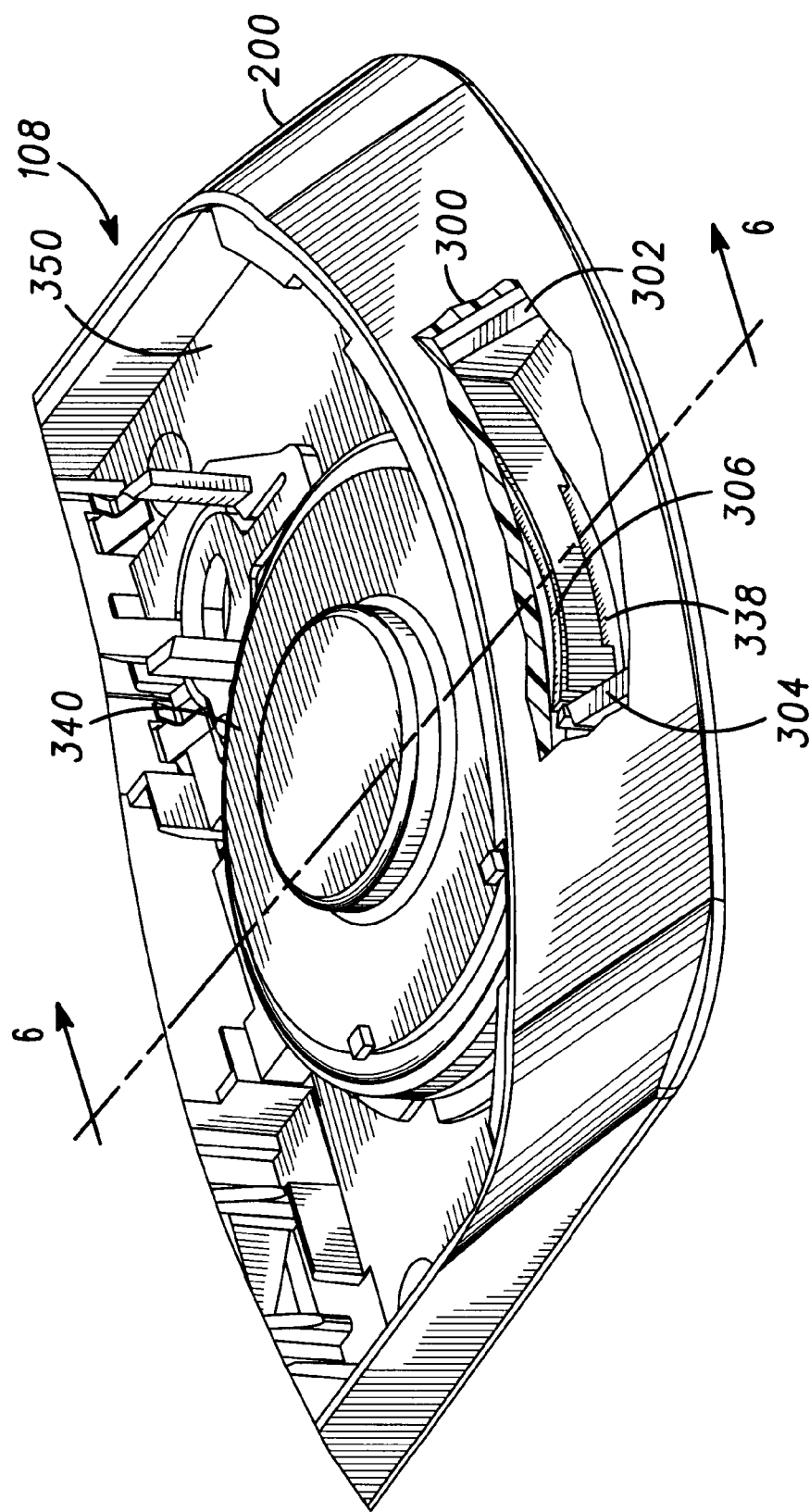
FIG. 4 is a perspective view of a partial assembly of an alternate embodiment of the upper housing with a cutaway.

FIG. 4 is a partial perspective view of an alternate embodiment of the upper housing 108 with a cutaway 300 exposing additional port 338. Port 338 provides an acoustic duct to openings 116 in the ear placement region 120 for acoustically tuning the air volume 360 as illustrated in FIG. 6. Port 338 is used in place of ports 320 in the preferred embodiment illustrated in FIG. 5. Internal air cavity 350 behind speaker 340 in FIG. 4 is acoustically sealed from the front of speaker 340 by the spacer 342 and the felt member 344, and from air cavity 352 by the spacer 342 and the gasket 306 as illustrated in FIG. 6. Thus, this port and cavity system in FIG. 4 is enclosed and sealed off from the internal cavity 350 by way of the spacer 342, the felt member 344 and the gasket 306. The air cavity 352 in FIG. 4 is formed by walls 302 and 304, the adjacent wall of the spacer 342 and the adjacent walls of upper housing 108. The gasket 306 in FIG. 4 provides a seal between spacer 342 and wall 302, wall 304 and adjacent walls of the upper housing 108.

According to a feature of the present invention, a speaker 340 having a relatively high compliance can be used for both private operation and for handsfree operation when the speaker 340 and housing 108 as an assembly are acoustically tuned as illustrated in the embodiments in FIGS. 5 and 6 so that the low frequency response in private operation is substantially improved. The high effective air volume of high compliance speaker 340 is compensated by acoustically coupling the air volume 360 between the front wall 346 of upper housing 108 and the user's ear via ports 320, air cavity 352 and ports 220 to the air volume 370 (free air) behind back wall 348 in the preferred embodiment in FIG. 5, and via openings 112, 114, 116, port 338 in spacer 342, air cavity 352 and the five ports 220 to the air volume 370 behind back wall 348 in the alternate embodiment in FIG. 6. Acoustic tuning adjustment may be made by varying the number, length and cross-sectional area of ports 220 and 320 in FIG. 5, and port 338, ports 220 and openings 112, 114, 116 in FIG. 6. Acoustic tuning adjustment may also be made by varying the volume of the air cavity 352 in FIGS. 5 and 6.

FIG. 5 is a cross-section view of a preferred embodiment of upper housing 108 taken along a line 5–5' of FIG. 3, where upper housing 108 is configured as shown in FIG. 3. FIG. 5 shows an internal air cavity 350 formed in upper housing 108, which is substantially separate from the air volume 360 formed between the front wall 346 of upper housing 108 at the periphery of the ear placement region 120 and the user's ear. Internal air cavity 350 in FIG. 5 is also substantially separate from the air cavity 352. Spacer 342 and felt member 344 offset speaker 340 a predetermined distance from the ear placement region 120 and acoustically seal air cavity 350 from the front wall 346 of upper housing 108. Felt member 344 also prevents dirt and other contaminants from entering upper housing 108. Air volume 360 between the front wall 346 of upper housing 108 and the user's ear is acoustically coupled via an air path formed by the five ports 320, air cavity 352 and the five ports 220 to air volume 370 behind back wall 348. Although configured in FIG. 5 with a port 320, an air cavity 352 and a port 200, other configurations of ports and/or cavities may be used to tune the air volume 360, such as, for example, a single port from an opening 320 on the front wall 346 to an opening 220 on the back wall 348. Ports 220 and 320 provide acoustic inertance, and air cavity 352 provides acoustic compliance in the port and cavity system in FIG. 5.

FIG. 6 is a partial cross-section view of an alternate embodiment of upper housing 108 taken along a line 6–6' of FIG. 4, where upper housing 108 is configured as shown in FIG. 4. FIG. 6 shows an internal air cavity 350 formed in upper housing 108, which is substantially separate from the air volume 360 formed between the front wall 346 of upper housing 108 at the periphery of the ear placement region 120 and the user's ear. Internal air cavity 350 in FIG. 6 is also substantially separate from the air cavity 352. Spacer 342 and felt member 344 offset speaker 340 a predetermined distance from the ear placement region 120 and acoustically seal air cavity 350 from the front wall 346 of upper housing 108. Air volume 360 between the front wall 346 of upper housing 108 and the user's ear is acoustically coupled via an air path formed by openings 112, 114, 116, port 338 in spacer 342, air cavity 352 and the five ports 220 to air volume 370 behind back wall 348. Ports 338 and 220 provide acoustic inertance, and air cavity 352 provides acoustic compliance in the port and cavity system in FIG. 6. Felt member 344 also introduces some acoustic inertance in FIG. 6.

Figure 7:
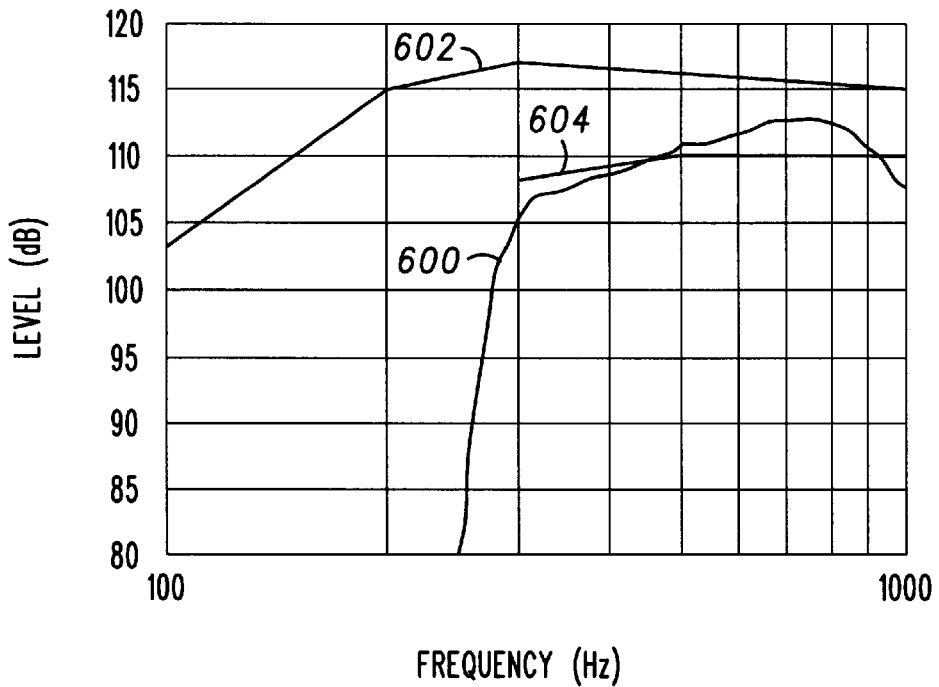
FIG. 7 shows a graph of the acoustic frequency response curve of the portable radio telephone in FIGS. 1 and 2 when used in private operation without the port and cavity system shown in FIGS. 5 and 6.

FIG. 7 shows a graph of acoustic frequency response curve 600 of a portable radio telephone 100 in FIGS. 1 and 2 without the port and cavity system shown in FIGS. 5 and 6, when used in private operation. Acoustic frequency response curve 600 was obtained using a Foster T028S15 type speaker 340 (a relatively high compliance speaker) where ear placement region 120 was sealed to the artificial ear. Curve 602 is the desired upper limit, and curve 604 is the desired lower limit for the acoustic response of portable radio telephone 100. As acoustic frequency response curve 600 reveals, a substantial bass loss occurs using a portable radio telephone 100 in private operation without the acoustic porting in FIGS. 5 and 6.

Figure 8:
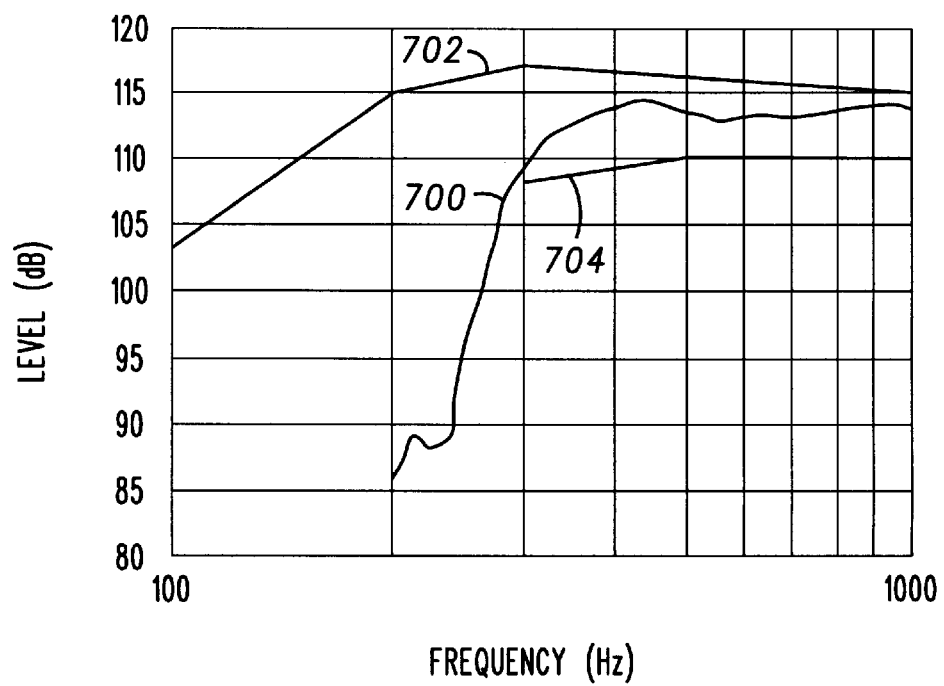
FIG. 8 shows a graph of acoustic frequency response curve of portable radio telephone in FIGS. 1 and 2 when used in private operation with with the port and cavity system shown in FIG. 5.

FIG. 8 shows a graph of acoustic frequency response curve 700 of the portable radio telephone 100 in FIGS. 1 and 2 with the port and cavity system shown in FIG. 5, when used in private operation. Acoustic frequency response curve 700 was obtained using a Foster T028S15 speaker 340 where ear placement region 120 was sealed to the artificial ear. Curve 702 is the desired upper limit, and curve 704 is the desired lower limit for the acoustic response of portable radio telephone 100. As acoustic frequency response curve 700 reveals, no substantial bass loss occurs using the portable radio telephone 100 in private operation with the port and cavity system shown in FIG. 5.

In the preferred embodiment of the portable radio telephone 100, internal air cavity 350 in FIG. 5 is designed to optimize the acoustic frequency response of the speaker and housing assembly in handsfree operation, and then port 320, air cavity 352, and port 220 in FIG. 5 are designed to optimize the acoustic frequency response in private operation. When the portable radio telephone 100 is used in handsfree operation, air space 360 is free air and the port and cavity system in FIG. 5 has no effect. When the portable radio telephone 100 is used in private operation, air space 360 is that volume of air between the front wall 346 of upper housing 108 and the user's ear, and ports 320, air cavity 352, and ports 220 in FIG. 5 compensate the acoustic frequency response for the effect of air space 360. In the alternate embodiment illustrated in FIG. 6, openings 112, 114, 116, port 338 in spacer 342, air cavity 352 and the ports 220 compensate the acoustic frequency response for the effect of air space 360 in private operation.

Thus, a portable electronic device is adapted to provide handsfree operation and adapted to be held against a user's ear to provide private operation. A housing is configured to carry at least one of a receiver and a transmitter. The housing further has an ear placement region on a front surface thereof. A speaker is disposed in the housing behind the ear placement region. The ear placement region is adapted to be held against a user's ear to provide private operation creating a first air volume between the user's ear and the ear placement region. An air path formed in the housing includes at least a first port positioned within the ear placement region and at least a second port positioned at a back surface of the housing. The air path leads from the first air volume to a second air volume at the back surface of the housing via the at least first port and the at least second port. The air path may further include a second air cavity between the first port and the second port for providing additional acoustic tuning. A preferred embodiment of the portable electronic device is a portable radio telephone that provides handsfree and private operation. Other embodiments of the portable electronic device may include any communications device where both handsfree and private operation is desired.

While particular embodiments of the present invention have been shown and described, modifications may be made. It is therefore intended in the appended claims to cover all such changes and modifications which fall within the true spirit and scope of the invention.

What is claimed is:

1. An electronic device adapted to provide handsfree operation and adapted to be held against a user's ear to provide private operation, the electronic device comprising:
   a housing, the housing configured to carry at least one of a receiver and a transmitter, the housing having a front surface and a back surface, the housing further having an ear placement region on the front surface thereof;
   a speaker disposed in the housing adjacent the ear placement region, the ear placement region adapted to be held against a user's ear to provide private operation creating a first air volume between the user's ear and the ear placement region, an internal air cavity disposed between the speaker and the back surface of the housing; and
   an air path formed in the housing, the air path having at least a first port positioned within the ear placement region and at least a second port positioned at the back surface of the housing, the air path leading from the first air volume to a second air volume at the back surface of the housing via the at least first port and the at least second port, and the air path being substantially acoustically sealed from the internal air cavity.

2. The electronic device according to claim 1, further including an additional air cavity disposed in the housing between the first port and the second port, the air path leading from the first air volume to the second air volume via the at least first port, the additional air cavity and the at least second port.

3. The electronic device according to claim 1, further including a spacer between the speaker and the housing for spacing the speaker a predetermined distance from the housing.

4. The electronic device according to claim 3, further including a felt member between the spacer and the housing for preventing contaminants from entering the housing.

5. An electronic device adapted to provide handsfree operation and adapted to be held against a user's ear to provide private operation, the portable electronic device comprising:
   a housing, the housing configured to carry at least one of a receiver and a transmitter, the housing having a front surface and a back surface, the housing further having an ear placement region on the front surface thereof;
   a speaker disposed in the housing adjacent the ear placement region, the ear placement region adapted to be held against a user's ear to provide private operation creating a first air volume between the user's ear and the ear placement region;
   an air path formed in the housing, the air path having at least a first port positioned within the ear placement region and at least a second port positioned at the back surface of the housing, the air path leading from the first air volume to a second air volume at the back surface of the housing via the at least first port and the at least second port; and
   wherein the air path includes at least one additional port positioned within the ear placement region and at least one additional port positioned at the back surface of the housing.

6. An electronic device adapted to provide handsfree operation and adapted to be held against a user's ear to provide private operation, the electronic device comprising:
   a housing, the housing configured to carry at least one of a receiver and a transmitter, the housing having a front surface and a back surface, the housing further having an ear placement region on the front surface thereof, the housing further including at least a first opening positioned within the ear placement region;
   a speaker disposed in the housing adjacent the ear placement region, the ear placement region adapted to be held against a user's ear to provide private operation creating a first air volume between the user's ear and the ear placement region, an internal air cavity disposed between the speaker and the back surface of the housing;
   a spacer between the speaker and the housing for spacing the speaker a predetermined distance from the housing, the spacer further including a first port coupled to the at least first opening; and
   an air path formed in the housing, the air path having the at least first opening positioned within the ear placement region, a first port, and at least a second port positioned at the back surface of the housing, the air path leading from the first air volume to a second air volume at the back surface of the housing via the at least first opening, the first port and the at least second port, and the air path being substantially acoustically sealed from the internal air cavity.

7. The electronic device according to claim 6, further including an additional air cavity disposed in the housing between the first port and the second port, the air path leading from the first air volume to the second air volume via the at least first opening, the first port, the additional air cavity and the at least second port.

8. The electronic device according to claim 6, further including a felt member between the spacer and the housing for preventing contaminants from entering the housing.

9. An electronic device adapted to provide handsfree operation and adapted to be held against a user's ear to provide private operation, the portable electronic device comprising:

a housing, the housing configured to carry at least one of a receiver and a transmitter, the housing having a front surface and a back surface, the housing further having an ear placement region on the front surface thereof, the housing further including at least a first opening positioned within the ear placement region;

a speaker disposed in the housing adjacent the ear placement region, the ear placement region adapted to be held against a user's ear to provide private operation creating a first, air volume between the user's ear and the ear placement region;

a spacer between the speaker and the housing for spacing the speaker a predetermined distance from the housing, the spacer further including a first port coupled to the at least first opening;

an air path formed in the housing, the air path having the at least first opening positioned within the ear placement region, a first port, and at least a second port positioned at the back surface of the housing, the air path leading from the first air volume to a second air volume at the back surface of the housing via the at least first opening, the first port and the at least second port; and wherein the air path includes at least one additional port at the back surface of the housing.

10. A radio telephone adapted to provide handsfree operation and adapted to be held against a user's ear to provide private operation, the radio telephone comprising:

a housing having an upper housing and a lower housing, the lower housing configured to carry a receiver and a transmitter, the upper housing having a front surface and a back surface, the upper housing further having an ear placement region on the front surface thereof;

a speaker disposed in the upper housing adjacent the ear placement region, the ear placement region adapted to be held against a user's ear to provide private operation creating a first air volume between the user's ear and the ear placement region, an internal air cavity disposed between the speaker and the back surface of the upper housing; and an air path formed in the upper housing, the air path having at least a first port positioned within the ear placement region and at least a second port positioned at the back surface of the upper housing, the air path leading from the first air volume to a second air volume at the back surface of the upper housing via the at least first port and the at least second port, and the air path substantially acoustically sealed from the internal air cavity.

11. The radio telephone according to claim 10, further including an additional air cavity disposed in the upper housing between the first port and the second port, the air path leading from the first air volume to second air volume via the at least first port, the additional air cavity and the at least second port.

12. The radio telephone according to claim 10, further including a spacer between the speaker and the upper housing for spacing the speaker a predetermined distance from the upper housing.

13. The radio telephone according to claim 12, further including a felt member between the spacer and the upper housing for preventing contaminants from entering the upper housing.

14. The radio telephone according to claim 10, further including a cavity in the upper housing adapted to receive a battery pack for powering the radio telephone.

15. A radio telephone adapted to provide handsfree operation and adapted to be held against a user's ear to provide private operation, the portable radio telephone comprising:

a housing having an upper housing and a lower housing, the lower housing configured to carry a receiver and a transmitter, the upper housing having a front surface and a back surface, the upper housing further having an ear placement region on the front surface thereof;

a speaker disposed in the upper housing adjacent the ear placement region, the ear placement region adapted to be held against a user's ear to provide private operation creating a first air volume between the user's ear and the ear placement region;

an air path formed in the upper housing, the air path having at least a first port positioned within the ear placement region and at least a second port positioned at the back surface of the upper housing, the air path leading from the first air volume to a second air volume at the back surface of the upper housing via the at least first port and the at least second port; and wherein the air path includes at least one additional port positioned within the ear placement region and at least one additional port positioned at the back surface of the upper housing.

16. A radio telephone adapted to provide handsfree operation and adapted to be held against a user's ear to provide private operation, the radio telephone comprising:

a housing having an upper housing and a lower housing, the lower housing configured to carry receiver and a transmitter, the upper housing having a front surface and a back surface, the upper housing further having an ear placement region on the front surface thereof, the upper housing further including at least a first opening positioned within the ear placement region;

a speaker disposed in the upper housing adjacent the ear placement region, the ear placement region adapted to be held against a user's ear to provide private operation creating a first air volume between the user's ear and the ear placement region, an internal air cavity disposed between the speaker and the back surface of the upper housing;

a spacer between the speaker and the upper housing for spacing the speaker a predetermined distance from the upper housing, the spacer further including a first port coupled to the at least first opening; and an air path formed in the upper housing, the air path having the at least first opening positioned within the ear placement, a first port, and at least a second port positioned at the back surface of the upper housing, the air path leading from the first air volume to a second air volume at the back surface of the upper housing via the at least first opening, the first port and the at least second port, and the air path being substantially acoustically sealed from the internal air cavity.

17. The radio telephone according to claim 16, further including an additional air cavity disposed in the upper housing between the first port and the second port, the air path leading from the first air volume to the second air volume via the at least first opening, the first port, the additional air cavity and the at least second port.

18. The radio telephone according to claim 16, further including a felt member between the spacer and the housing for preventing contaminants from entering the housing.

19. The radio telephone according to claim 16, further including a cavity in the upper housing adapted to receive a battery pack for powering the radio telephone.

20. A radio telephone adapted to provide handsfree operation and adapted to be held against a user's ear to provide private operation, the radio telephone comprising:

a housing having an upper housing and a lower housing, the lower housing configured to carry receiver and a transmitter, the upper housing having a front surface and a back surface, the upper housing further having an ear placement region on the front surface thereof, the upper housing further including at least a first opening positioned within the ear placement region;

a speaker disposed in the upper housing adjacent the ear placement region, the ear placement region adapted to be held against a user's ear to provide private operation creating a first air volume between the user's ear and the ear placement region;

a spacer between the speaker and the upper housing for spacing the speaker a predetermined distance from the upper housing, the spacer further including a first port coupled to the at least first opening; and an air path formed in the upper housing, the air path having the at least first opening positioned within the ear placement region, a first port, and at least a second port positioned at the back surface of the upper housing, the air path leading from the first air volume to a second air volume at the back surface of the upper housing via the at least first opening, the first port and the at least second port; and wherein the air path includes at least one additional port at the back surface of the upper housing.

* * * * *